Aug. 13, 1935.   R. D. CARLETON   2,010,945
TAIL WHEEL FAIRING
Filed Jan. 6, 1933
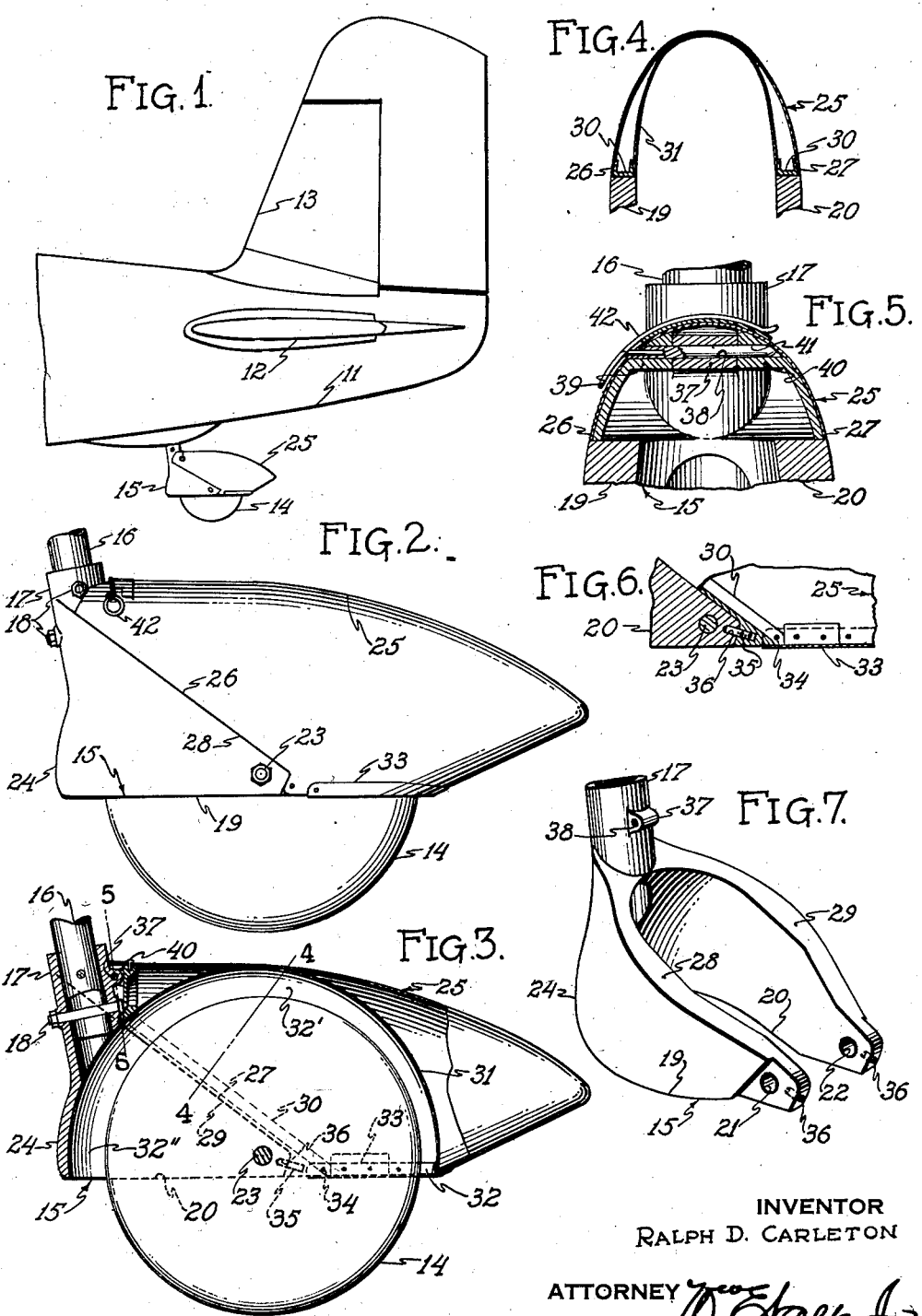
INVENTOR
RALPH D. CARLETON
ATTORNEY Patented Aug. 13, 1935

2,010,945

UNITED STATES PATENT OFFICE 2,010,945

TAIL WHEEL FAIRING

Ralph D. Carleton, Snyder, N. Y., assignor to Curtiss Aeroplane & Motor Company, Inc., a corporation of New York Application January 6, 1933, Serial No. 650,475

10 Claims. (Cl. 244—2)

This invention relates to aircraft, and more particularly to improvements in fairings for the landing wheels thereof.

Objects of the invention are:

(a) To provide a streamline fairing for a tail wheel;

(b) To provide a streamline tail wheel fairing which utilizes as part of the streamline form, the structural tail wheel supporting element;

(c) To provide a light sheet metal fairing for a tail wheel which may be quickly and easily attached or detached to facilitate inspection and wheel removal;

(d) To provide a novel means for attaching a wheel fairing, wherein, when attached, the fairing is supported at a plurality of points, and wherein removal of a single locking member permits disengagement of said fairing from its support;

(e) To provide a streamline wheel fairing having an inner shell conforming to the shape of the enclosed wheel;

(f) To provide novel means for preventing accumulations of mud and other foreign matter within the wheel fairing;

(g) To provide a wheel housing in which the distance between the housing and the wheel periphery increases from the point of entrance of the wheel periphery to the point of egress of the wheel periphery; and (h) To provide unitary spring retained means for locking a separable wheel fairing to a wheel support.

Other objects will be apparent from a reading of the subjoined specification and claims, and from a consideration of the accompanying drawing.

Broadly, the invention comprises a wheel fork carried by an aircraft, for pivoting about a substantially vertical axis. The tines of the fork extend rearwardly to allow the usual trailing or castering action for the wheel carried for rotation toward the rearward ends of the tines. These tines have relatively broad and thin side faces, and are so formed that, together they provide a streamline housing partly enclosing the forward portion of the wheel. A light weight fairing, to carry out the streamline of the fork, is attached thereto by suitable means, so that together, the fork and fairing enclose a major portion of the wheel and assist in materially reducing the parasitic drag normally caused by the tail ground contact element. As is well known, high speed aircraft must have all protuberances well streamlined to reduce drag, and this invention provides a streamlining without the frequent attendant disadvantages of added weight and inaccessibility to streamlined parts.

The fairing is provided with an inner annular shell conforming in shape to the wheel periphery, but having the center of the indicated annulus spaced ahead of the wheel center. This provides a clearance between the wheel periphery and the housing which is smaller at the rearward entering point of the wheel periphery than at any other point within the housing. It is apparent that, when rolling on the ground, only foreign matter of such size as will pass the small clearance can enter the housing, and that such foreign matter cannot clog within the housing due to the larger clearance therewithin. This construction, then, automatically prevents jamming of the wheel by mud accumulation—a distinct advantage for small diameter wheels such as tail wheels, which have a relatively small ground contact area and hence, relatively small tractive effect to dislodge mud accumulations.

A more detailed understanding of the invention may be had by reference to the drawing, in which similar numbers indicate similar parts, and in which:

Fig. 1 is a side elevation of the rearward portion of an airplane equipped with my invention;

Fig. 2 is a side elevation of the tail wheel and fairing;

Fig. 3 is a side elevation, partly in section, of the wheel fork and fairing;

Fig. 4 is a section on the line 4—4 of Fig. 3;

Fig. 5 is an enlarged section on the line 5—5 of Fig. 3;

Fig. 6 is an enlarged sectional detail of a portion of the fork and fairing; and Fig. 7 is a perspective view of the wheel fork.

An airplane fuselage 11 is equipped with the usual control surfaces 12 and 13 at its rearward end, and is provided with a tail wheel 14 for ground contact. A fork 15, having a shank 16, pivots about a substantially vertical axis in bearings (not shown) of conventional design carried within the fuselage 11. The fork 15 is provided with a boss 17, adapted to engage the shank 16, and is fastened thereto as by bolts 18 passing through both said members. Sweeping rearwardly from the boss 17, a pair of spaced fork tines 19 and 20 are adapted to partially enclose, and hold the wheel 14 for rotation. Bores 21 and 22 are provided in the rearward ends of the tines 19 and 20, respectively, to receive an axle bolt 23, for holding the wheel 14. It should be noted that the tines 19 and 20 are wide at their forward ends, and extend around the front of the wheel as at 24 to form a forwardly facing streamlined cover at the front of the wheel. A streamlined fairing 25 is formed to enclose the upper and rearward portion of the wheel 14, and to continue the streamline contour initiated by the outer surface of the fork 15. Said fairing, at its edges 26 and 27, is adapted to lie adjacent the upper edges 28 and 29 of the fork tines 19 and 20, respectively. To stiffen the fairing 25, a reinforcing channel 30 extends around the edges 26 and 27, said edges being attached as by riveting to the outer flange of the channel, the web of the channel bearing on the upper fork faces 28 and 29.

To the inner flange of the channel 30 is attached, as by riveting, an annular shell 31 lying wholly within the fairing 25. Said shell conforms generally to the shape of the wheel 14, but the center of the annulus, or the center of the arc limiting the outer border of the annulus, is offset forwardly from the wheel center, resulting in the annulus being eccentric to the wheel. By the aforementioned arrangement, a gap is left between the periphery of the wheel 14 and the shell 31, said periphery, assuming that the wheel turns counter-clockwise, entering the shell at 32, where the gap is relatively small. Following around and within the shell, the gap increases, as at 32', due to the eccentricity between the wheel 14 and the shell 31. This gap continues to increase, as at 32'', where the wheel periphery leaves the closed front portion 24 of the fork 15. Any foreign matter entering the shell at 32 can pass freely around the wheel periphery to leave the fork at 32'' without the possibility of collecting within the shell 31 or the fork 15, and jamming the wheel 14 as it rotates.

A reinforcing angle strip 33 is provided rearwardly of the tines 19 and 20, to join the lower rearward edge of the shell 31 to the lower edge of the fairing 25, both of which are formed to extend around the back of the wheel. Said strip 33 also serves as a mud scraper. At its forward ends, the strip 33 is connected to the rearward ends of the channel 31 as by rivets 34 (Figs. 3 and 6).

The rearward ends of the channel 30 are provided with dowel pins 35 adapted to face forwardly and engage within rearwardly facing openings 36 formed at the rearward ends of the fork tines 19 and 20. By the fitting engagement of the pins 35 within the openings 36, the rearward end of the fairing 25 is held in fixed relation to the fork 15. The boss 17 of the fork 15 is provided with a lug 37 having a transverse bore 38, said lug being adapted to engage between spaced lugs 39 and 40 carried by the fairing 25. Bores in the lugs 39 and 40, respectively, are adapted to align with the bore 38, in order that a locking pin 41 may be inserted through all said bores to rigidly hold the fairing 25 in place. Detachment of the fairing 25 is easily effected by withdrawing the pin 41, then by pushing the fairing 25 rearwardly until the pins 35 disengage the openings 36, whereupon the fairing may be bodily lifted off.

A spring 42 is attached to the outer end of the pin 41, and is curved to clip over the top of the fairing 25 when said pin is in place, thus preventing said pin from being shaken loose accidentally. Manual withdrawal may be easily effected by grasping the spring, and drawing it and the attached pin 41 from the lugs in which it rests.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft, a wheel, a support for said wheel, a fairing for said wheel, and means for attaching said fairing to said support including a plurality of devices carried by said fairing, a plurality of means carried by said support with which said devices are adapted to engage, and a single lock member engaging one said means and one said device, which, when unlocked, permits disengagement of said other means and devices and removal of said fairing.

2. In aircraft, in combination, a support, a fairing adapted to be attached to said support, a plurality of pairs of inter-fitting devices carried by said support and by said fairing to effect attachment of one to the other, and a key adapted to engage one said pair, the withdrawal of which allows removal of said fairing from said support.

3. In aircraft, in combination, a support, a plurality of devices carried thereby, a fairing, a plurality of means carried by said fairing, each adapted to engage one said device, said support and said fairing being attached one to the other by the engagement of said means and devices, and a single member adapted to engage one said means and one said device for preventing disengagement of all said means and devices.

4. A streamline wheel fairing for aircraft including an inner annular shell within which a wheel is adapted to be housed, said shell being spaced closely to the periphery of said wheel at the point of entry of said periphery into said shell, and being spaced at a greater distance from said periphery throughout the remainder of said shell.

5. In aircraft, a wheel fairing adapted to enclose a portion of a rotatable wheel, said fairing being spaced closer to the periphery of said wheel at the point of entry thereof within said fairing than at any other point in the travel of said wheel periphery within said fairing.

6. In aircraft, in combination, a streamline fairing having an opening, and a wheel adapted to be held for rotation therewithin and to protrude through said opening, said wheel being arranged to lie closer to said fairing at the rearward edge of said opening than at the forward edge thereof, whereby foreign matter entering said fairing through the relatively small opening between said wheel and the rearward edge of said opening is allowed free egress toward the forward edge of said opening.

7. In aircraft, a wheel, a wheel fairing adapted to enclose a portion of said wheel and having therein a substantially arcuate shell spaced from said wheel, the center from which the indicated arc is struck being in advance of the axis of said wheel.

8. In aircraft, a wheel, an annular housing for a substantial portion of said wheel, the indicated annulus being eccentric to the wheel for forming a relatively narrow clearance between said wheel and the rearward portion of said housing, and a relatively wide clearance between said wheel and the forward portion of said housing.

9. In aircraft, in combination, means for attaching a wheel fairing to a support comprising a lug carried by said support and having a bore, a fitting carried by said fairing and having a bore, said fitting being adapted to lie in such relation to said lug that said bores are aligned, the bore in said fitting being extended to an outer surface of said fairing, and a pin adapted to be inserted from outside said fairing into said bores for holding said fairing to said support.

10. In aircraft, in combination, means for attaching a wheel fairing to a support comprising a lug carried by said support and having a bore, a fitting carried by said fairing and having a bore, said fitting being adapted to lie in such relation to said lug that said bores are aligned, the bore in said fitting being extended to an outer surface of said fairing, and a pin adapted to be inserted from outside said fairing into said bores for holding said fairing to said support, said pin having a spring clip at its outer end for engagement with said fairing to hold said pin within said bores.

RALPH D. CARLETON.